Nov. 25, 1958   V. P. DONNER   2,861,478
DIFFERENTIAL FOR VEHICLES
Filed Nov. 9, 1956
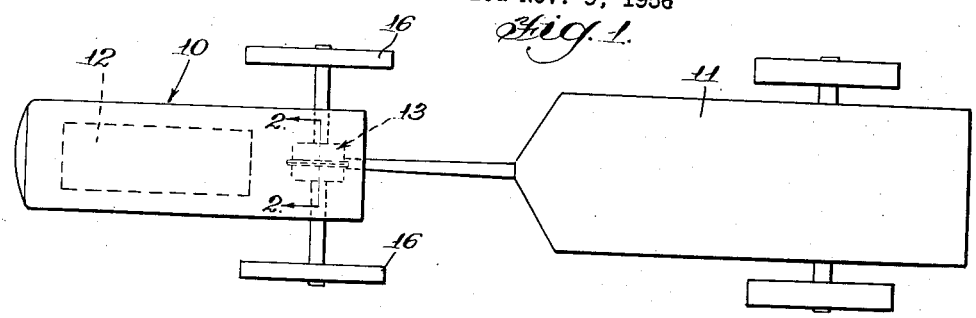
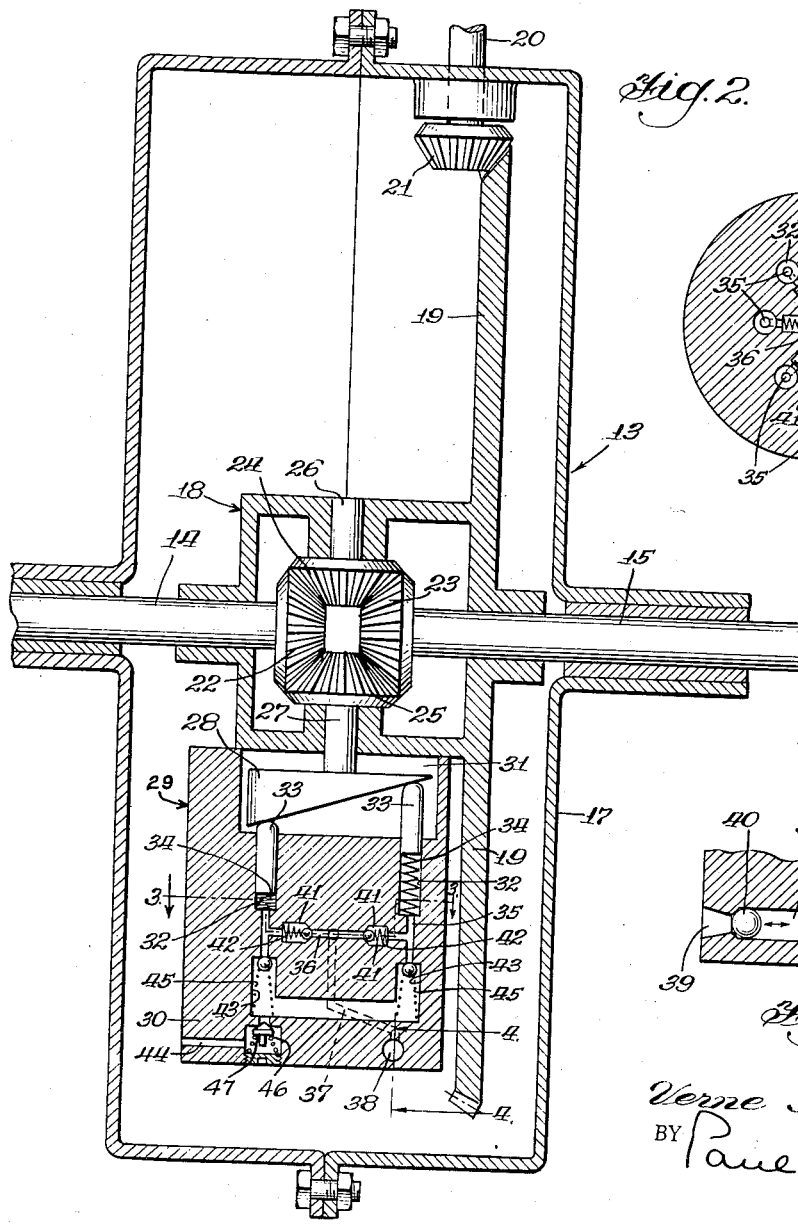
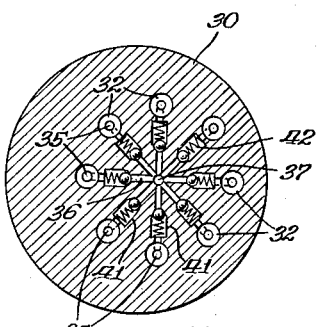
INVENTOR.
Verne P. Donner
BY Paul O. Pippel
Atty.

United States Patent Office 2,861,478
Patented Nov. 25, 1958

2,861,478

DIFFERENTIAL FOR VEHICLES

Verne P. Donner, Palatine, Ill., assignor to International Harvester Company, a corporation of New Jersey Application November 9, 1956, Serial No. 621,432

3 Claims. (Cl. 74—711)

This invention relates to self propelled vehicles and is primarily concerned with an improved differential for a self propelled vehicle.

An object of the invention is to provide a differential wherein if one drive wheel of a vehicle is spinning on a nontraction surface and the other drive wheel is on a traction surface the latter drive wheel will grip the traction surface and be effective to move the vehicle.

Another object of the invention is to provide a differential with improved means thereon which would reduce to a conventional differential if the means failed to function.

A further object of the invention is to provide an improved means for a differential which could be installed on a conventional differential of a vehicle already in use.

The foregoing and other objects of the invention will be apparent from the construction and arrangement illustrated in the accompanying drawings wherein:

Figure 1 is a top plan view of a two wheel tractor and a scraper connected to the tractor, Figure 2 is a cross sectional view of the differential of the present invention taken on the line 2—2 of Figure 1, Figure 3 is a sectional view taken on the line 3—3 of Figure 2, and Figure 4 is a sectional view taken on the line 4—4 of Figure 2.

If a vehicle having a conventional differential should encounter a condition where the surface under one rear wheel would provide traction while the surface under the other rear wheel would not provide traction as where the latter surface is mud or ice the traction wheel would soon become stationary and the non-traction wheel would start spinning. Another differential has been developed where the two sections of the rear axle are locked to rotate at the same R. P. M. However this differential has friction blocks which wear and create heat and if the friction blocks break the differential is out of operation and the differential will not move the vehicle on any surface and cannot be used again until it has been completely rebuilt and reinstalled in the vehicle. In this latter differential where both rear wheels are on a traction surface there is traction only on the inner wheel in a turn and the outer wheel is spinning.

The invention proposes an improved differential for vehicles. The vehicle has the usual axle made up of a pair of sections arranged in end to end spaced relation. The differential is comprised of gears fixedly secured on the adjacent ends of the sections and a cage is rotatably mounted on the sections and is driven by the vehicle power means. A pair of opposed gears are rotatably mounted in the cage and mesh with the gears on the sections and a cam is mounted on the shaft of one of the opposed gears. Means is fixedly secured to the cage and resists rotation of the cam and of the gear to which the cam is fixedly secured. With applicants differential if the surface under one rear wheel is a traction surface and the surface under the other rear wheel is not the resistance to rotation of the gear to which the cam is fixed will cause the sections of the axle to rotate fairly close to the same R. P. M. and the rear wheel on the traction surface will grip the surface while the other rear wheel will spin. Thus if one wheel is on a traction surface and the other rear wheel is on a non-traction surface the wheel on the traction surface will be effective to move the vehicle. If the means fails applicants differential would reduce to a conventional differential and the vehicle could be driven to a repair shop after the vehicle is moved so that both wheels are on a traction surface. Applicants cam and means could be installed on a conventional differential of a vehicle already in use. If both rear wheels of a vehicle are on a traction surface applicants differential will result in traction on both rear wheels in a turn. Applicants differential is subjected to less wear and longer life than differentials developed since the conventional differential.

In the drawings, 10 generally designates a vehicle in the form of a two wheel tractor and a scraper 11 is connected to the tractor. The tractor 10 has power means in the form of an internal combustion engine 12 and also has a differential 13. The tractor 10 has an axle made up of a pair of sections 14 and 15 arranged in end to end spaced relation and wheels 16 are fixedly secured to the outer ends of the sections. The differential 13 is comprised of a stationary casing 17 surrounding the sections 14 and 15 and the casing contains a liquid such as oil. A cage 18 is disposed in the casing 17 and is rotatably mounted on the sections 14 and 15 and has a bevel gear 19 integral therewith. A shaft 20 is rotatably mounted in the casing 17 and has a bevel gear 21 fixedly secured thereon which meshes with the bevel gear 19. The shaft 20 is operatively connected to the crankshaft of the engine 12. A bevel gear 22 is fixedly secured on the end of section 14 of the axle and a bevel gear 23 is fixedly secured on the end of section 15. A pair of bevel gears 24 and 25 are arranged in spaced opposed relation in the cage 18 and the gear 24 has a shaft 26 rotatably mounted in the cage and the gear 25 has a shaft 27 rotatably mounted in the cage and projecting therefrom. A cam 28 is disposed exteriorly of the cage 18 and is fixedly secured to the shaft 27. A hydraulic means 29 is disposed exteriorly of the cage 18 at the shaft 27 and is carried by the cage and is comprised of a housing 30 fixedly secured to the cage and the housing is provided with a recess 31 receiving the cam 28. The housing 30 is provided with a plurality of cylindrical openings 32 in the bottom of the recess 31 arranged with their centers lying on a circle so that they are in radially spaced relation and a piston 33 is disposed in each of the cylindrical openings. A coil spring 34 is disposed in each of the cylindrical openings 32 and urges the piston outwardly of the respective one of the openings to initially hold the pistons against the cam when the tractor is stationary. The housing 30 is provided with passages 35 in communication with the openings 32 and passages 36 in communication with each other and with the openings 35. The housing 30 is provided with a passage 37 in communication with the passages 36 and a chamber 38 and the chamber has opposed holes 39 in communication with the interior of the casing 17 and a valve element 40 in the form of a ball is disposed in the chamber. Each passage 36 is provided with a chamber 41 and a check valve 42 is disposed in each chamber and each check valve is made up of a ball and a coil spring urging the ball over the respective passage. The check valves 42 prevent flow of liquid from passages 35 to passage 37. A passage 43 is in communication with each passage 35 and a passage 44 is in communication with the passages 43 and the interior of the casing 17. A check valve 45 is disposed in each passage 43 and is made up of a ball and a coil spring urging the ball over the respective passage 35. Each check valve 45 prevents flow of liquid from passage 44 to the respective passage 35. The passage 44 is provided with a chamber 46 and a pressure relief valve 47 is disposed in the chamber and is made up of a plunger and a coil spring urging the plunger into the passage 44. The pressure relief valve 47 prevents flow of liquid from the interior of the casing 17 into the passages 43.

When the tractor is moving in one direction the cage 18 will be rotated in one direction by shaft 20 and liquid will enter the chamber 38 through one of the holes 39 and move the valve element so as to cover the other of the holes 39 and then will move into passage 37 due to the force of the liquid and the suction in the particular cylindrical openings 32 when their pistons 33 are on the upward stroke. The liquid will flow from passage 37 into passage 36 and overcome the force of the check valves 42 for the cylindrical openings 32 whose pistons are on the upward stroke and flow past the check valves into the passages 35 and then into the cylindrical openings 32 to urge the pistons 33 against the cam 28 to resist rotation of the bevel gear 25 while the check valves 42 for the cylindrical openings whose pistons are on the downward stroke will remain closed. When a piston 33 is on the downward stroke liquid is moved out of the respective opening 32 by the piston and the force of the piston overcomes the force of the respective check valve 45 and the liquid flows past the check valve into the respective passage 43 and then into passage 44. The pressure relief valve 47 is set for a definite pressure load and upon this pressure load being exceeded the valve will open and liquid will flow out of the passage 44 into the interior of the casing 17 and upon the pressure being reduced to the predetermined pressure load the pressure relief valve will close. By adjusting the pressure relief valve the resistance to rotation of cam 28 may be varied as desired. Upon the tractor being driven in the opposite direction the cage 18 will be rotated in the opposite direction and liquid will enter the chamber 38 through the other of the holes 39 and will move the valve element 40 so as to cover the hole 39 that was open during the operation described above and liquid will flow through the hydraulic means in the same manner as in the operation described above. If any part of the hydraulic means 29 fails applicants differential would reduce to a conventional differential. The hydraulic means 29 could be installed on a conventional differential of a vehicle already in use.

What is claimed is:

1. A differential for a vehicle including a power means and an axle made up of a pair of sections arranged in end to end spaced relation, the differential comprising a casing surrounding the sections and containing a liquid, a cage disposed in the casing and rotatably mounted on the sections and rotatably driven by the power means, a gear fixedly secured on said end of each of the sections, a pair of gears each having a shaft thereon arranged in spaced opposed relation in the cage and the shafts being rotatably mounted in the cage, a cam disposed exteriorly of the cage and fixedly secured to one of the shafts, and hydraulic means disposed exteriorly of the cage at said one of the shafts and fixedly secured to the cage and comprising a housing having a plurality of cylindrical openings therein arranged in a circle and a piston disposed in each of the cylindrical openings and intake passages in communication with the interior of the casing and the cylindrical openings and check valves in the intake passages to prevent flow of liquid from the cylindrical openings out the intake passages and exhaust passages in communication with the interior of the casing and the cylindrical openings and check valves in the exhaust passages opening to let liquid flow away from the cylindrical openings when the respective piston moves the liquid out of the respective cylindrical opening and pressure relief valves in the exhaust passages to exert resistance to turning of the cam and opening to let liquid flow into the interior of the casing at a predetermined pressure.

2. A differential for a vehicle including a power means and an axle made up of a pair of sections arranged in end to end spaced relation, the differential comprising a casing surrounding the sections and containing a liquid, a cage disposed in the casing and rotatably mounted on the sections and rotatably driven by the power means, a gear fixedly secured on said end of each of the sections, a pair of gears each having a shaft thereon arranged in spaced opposed relation in the cage and the shafts being rotatably mounted in the cage, a cam disposed exteriorly of the cage and fixedly secured to one of the shafts, and hydraulic means disposed exteriorly of the cage at said one of the shafts and fixedly secured to the cage and comprising a housing having a plurality of cylindrical openings therein arranged in a circle and a piston disposed in each of the cylindrical openings and an intake passage in communication with the interior of the casing and having branch passages in communication with the cylindrical openings and check valves in the branch passages to prevent flow of liquid from the cylindrical openings into the intake passage and an exhaust passage in communication with the interior of the casing and having branch passages in communication with the cylindrical openings and check valves in the branch passages opening to let liquid flow into the exhaust passage when the respective piston moves the liquid out of the respective cylindrical opening and a pressure relief valve in the exhaust passage to exert resistance to turning of the cam and opening to let liquid flow into the interior of the casing at a predetermined pressure.

3. A differential for a vehicle including an engine and an axle made up of a pair of sections arranged in end to end spaced relation, the differential comprising a casing containing a liquid, a cage disposed in the casing and rotatably mounted on the sections and rotatably driven by the engine, a gear fixedly secured on said end of each of the sections, a pair of gears each having a shaft thereon arranged in spaced opposed relation in the cage and the shafts being rotatably mounted in the cage, a cam disposed exteriorly of the cage and fixedly secured to one of the shafts, and hydraulic means disposed exteriorly of the cage at said one of the shafts and fixedly secured to the cage and comprising a housing having a pair of cylindrical openings therein and a piston disposed in each of the cylindrical openings and the housing being provided with a first passage communicating with one of the cylindrical openings and a second passage communicating with the other of the cylindrical openings and a third passage in communication with the first and second passages and a pair of spaced check valves in the third passage each allowing flow of liquid to the adjacent cylindrical opening and a fourth passage in communication with the third passage between the pair of check valves and in communication with the interior of the casing and a fifth passage in communication with the first and second passages and the interior of the casing and a pressure relief valve in the fifth passage allowing flow of liquid from the fifth passage into the interior of the casing and a check valve in the first passage between the third and fifth passages allowing flow of liquid from the first passage and a check valve in the second passage between the third and fifth passages allowing flow of liquid from the second passage.

References Cited in the file of this patent
UNITED STATES PATENTS
2,305,092   Lawrence _____ Dec. 15, 1942